(12) United States Patent
Sanghvi et al.

(10) Patent No.: US 11,816,726 B2
(45) Date of Patent: Nov. 14, 2023

(54) MACHINE LEARNING BASED AUTOMATED MANAGEMENT OF CUSTOMER ACCOUNTS

(71) Applicant: Bank of America Corporation, Charlotte, NC (US)

(72) Inventors: Siten Sanghvi, Westfield, NJ (US); Morgan S. Allen, Waxhaw, NC (US); Matthew E. Carroll, Charlotte, NC (US); Tamara S. Kingston, Peoria, AZ (US); Stephen T. Shannon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/941,710

(22) Filed: Jul. 29, 2020

(65) Prior Publication Data
US 2022/0036450 A1 Feb. 3, 2022

(51) Int. Cl.
*G06Q 20/00* (2012.01)
*G06Q 40/03* (2023.01)
(Continued)

(52) U.S. Cl.
CPC ............. *G06Q 40/03* (2023.01); *G06N 5/043* (2013.01); *G06N 20/00* (2019.01); *G06Q 20/22* (2013.01);
(Continued)

(58) Field of Classification Search
CPC ...... G06Q 40/02; G06Q 40/025; G06Q 20/22; G06Q 20/405; G06N 20/00; G06N 5/04; G06N 5/043
(Continued)

(56) References Cited

U.S. PATENT DOCUMENTS 7,748,614 B2  7/2010  Brown
8,135,634 B2  3/2012  Abeles
(Continued)

FOREIGN PATENT DOCUMENTS

WO    2013037044 A1    3/2013

OTHER PUBLICATIONS

Jun. 7, 2022—U.S. Non-Final Office Action—U.S. Appl. No. 16/941,858.
(Continued)

*Primary Examiner* — Mike Anderson
*Assistant Examiner* — Mohammed H Mustafa
(74) *Attorney, Agent, or Firm* — Banner & Witcoff, Ltd.

(57) ABSTRACT

Aspects of the disclosure relate to machine learning based automated management of a user account. A computing platform may determine, via a computing device and based on historical user activity of a user, a pattern of the user activity. Subsequently, the computing platform may detect a deviation from the pattern of the user activity. Then, the computing platform may identify an anticipated transaction of the user. Then, the computing platform may retrieve, from a repository of user data, one or more user-defined preference rules associated with the anticipated transaction. Then, the computing platform may determine whether the one or more preference rules apply to one or more attributes of the anticipated transaction. Subsequently, the computing platform may trigger, based on a determination that the one or more preference rules apply to the one or more attributes of the anticipated transaction, an action associated with the anticipated transaction.

16 Claims, 5 Drawing Sheets

(51) Int. Cl.
- *G06Q 20/22* (2012.01)
- *G06N 20/00* (2019.01)
- *G06N 5/043* (2023.01)
- *G06Q 20/40* (2012.01)

(52) U.S. Cl.
CPC ....... *G06Q 20/405* (2013.01); *G06Q 20/4016* (2013.01)

(58) Field of Classification Search
USPC .................................................. 705/4, 35–45
See application file for complete search history.

(56) References Cited

U.S. PATENT DOCUMENTS

| | | | |
|---|---|---|---|
| 8,271,355 | B2 | 9/2012 | Johnson et al. |
| 8,302,852 | B2 | 11/2012 | Brown |
| 8,650,072 | B2 | 2/2014 | Mason et al. |
| 9,166,993 | B1* | 10/2015 | Liu .................... H04L 63/1425 |
| 9,390,410 | B2 | 7/2016 | Casares et al. |
| 10,346,869 | B1 | 7/2019 | Ahmed et al. |
| 10,592,961 | B1 | 3/2020 | Price et al. |
| 2013/0097002 | A1 | 4/2013 | Dishneau et al. |
| 2014/0025453 | A1 | 1/2014 | Knowles et al. |
| 2014/0095285 | A1 | 4/2014 | Wadell et al. |
| 2017/0351978 | A1* | 12/2017 | Bellowe ................. G06Q 30/02 |
| 2018/0107917 | A1 | 4/2018 | Hewavitharana et al. |
| 2018/0247241 | A1* | 8/2018 | Avrahami ........ G06Q 10/06316 |
| 2018/0260875 | A1 | 9/2018 | Jayaraman et al. |
| 2019/0205839 | A1* | 7/2019 | Dotan-Cohen .............................. G06Q 10/063116 |
| 2019/0287157 | A1 | 9/2019 | Rubin et al. |
| 2020/0090261 | A1 | 3/2020 | Tumulty, II et al. |
| 2020/0380481 | A1 | 12/2020 | Kalaboukis |

OTHER PUBLICATIONS

Milford, Michael et al., "When AI meets your shopping experience it knows what you buy—and what you ought to buy", Aug. 30, 2018, at <https://theconversation.com/when-ai-meets-your-shipping-experience-it-knows-what-you-buy-and-what-you-ought-to-buy-101737. (Year: 2018).

Jan. 25, 2023—(US) Non-Final Office Action—U.S. Appl. No. 16/941,858.

Jul. 26, 2023—(U.S.) Notice of Allowance—U.S. Appl. No. 16/941,858.

* cited by examiner

MACHINE LEARNING BASED AUTOMATED MANAGEMENT OF CUSTOMER ACCOUNTS

BACKGROUND

Aspects of the disclosure relate to deploying machine learning systems to provide relief to users in need. In particular, one or more aspects of the disclosure relate to machine learning based automated management of a user account.

Enterprise organizations may utilize various computing infrastructure to transact business with their customers. In some instances, customers may experience hardships, and this may result in an inability to manage financial and other related transactions. Detecting when a customer is experiencing hardship, and providing appropriate relief to the customer, may be of high significance to an enterprise organization. In many instances, however, it may be difficult to ensure detection of such hardships, and remediating effects of the hardship, while also attempting to optimize the resource utilization, bandwidth utilization, and efficient operations of the computing infrastructure involved in maintaining, accessing, and executing such activities.

SUMMARY

Aspects of the disclosure provide effective, efficient, scalable, fast, reliable, and convenient technical solutions that address and overcome the technical problems associated with automated management of a user account.

In accordance with one or more embodiments, a computing platform having at least one processor, and memory, may determine, via a computing device and based on historical user activity of a user, a pattern of the user activity. Subsequently, the computing platform may detect, via the computing device, a deviation from the pattern of the user activity. Then, the computing platform may identify, via the computing device, an anticipated transaction of the user. Then, the computing platform may retrieve, from a repository of user data, one or more user-defined preference rules associated with the anticipated transaction. Then, the computing platform may determine whether the one or more preference rules apply to one or more attributes of the anticipated transaction. Subsequently, the computing platform may trigger, via the computing device and based on a determination that the one or more preference rules apply to the one or more attributes of the anticipated transaction, an action associated with the anticipated transaction.

In some embodiments, the action associated with the anticipated transaction may include providing, via an intelligent virtual assistant, a recommendation to perform the anticipated transaction.

In some embodiments, the action associated with the anticipated transaction may include payment of an outstanding balance.

In some embodiments, the computing platform may identify, from one or more external sources of data, one or more events that may impact the pattern of the user activity. Then, the computing platform may identify an event of the one or more events that impacts the pattern of the user activity, where the action associated with the anticipated transaction may include a recommendation that minimizes the impact of the event for the user. In some embodiments, the one or more external sources of data may be artificial intelligence based systems. In some embodiments, the event may include one or more of a weather related event, an employment related event, a purchase related event, and a geopolitical event.

In some embodiments, the computing platform may determine the one or more user-defined preference rules by establishing, via an intelligent virtual assistant, an interactive session with the user. Then, the computing platform may provide, to the user, one or more questions in sequential format. Then, the computing platform may receive, from the user, responses to the one or more questions. Subsequently, the computing platform may provide, to the user and based on the responses, one or more additional questions. Then, the computing platform may receive, from the user, responses to the one or more additional questions. In some embodiments, the computing platform may train the intelligent virtual assistant based on a machine learning model.

In some embodiments, the one or more user-defined preference rules may include one or more of a preference associated with an automatic loan amount, a secondary funding source, automatic payment options, a designated alternate decision making authority, and preferred communication channels.

In some embodiments, the computing platform may train a machine learning model to determine the pattern of the user activity. In some embodiments, the computing platform may apply the machine learning model to detect the deviation from the pattern of the user activity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Enterprise users may be faced with challenges from one or more events. For example, the enterprise user may be undergoing a treatment, may have suffered an accident, may be in a disaster-struck region, may have lost employment, and so forth. Generally, such events may impact the enterprise user's ability to make timely payments. Also, for example, an enterprise user may be unaware of a type of resources that may be available at a time of need. In some instances, an enterprise organization may be better able to serve its customers by understanding customer behavior and tailoring resources to the customer. Also, for example, the enterprise organization may tailor resources based on user-defined preferences. Accordingly, it may be of high significance for an enterprise organization to devise ways in which to protect the financial integrity of an enterprise user. Fast and reliable responses to potential events that may impact a customer's well-being may be of high significance to the enterprise organization.

Some aspects of the disclosure relate to utilizing machine learning models to detect patterns of customer activity, identify relevant resources, identify customer preferences, and provide timely and effective relief to the customer. Fast information processing, fast data transmission rates, availability of bandwidth, and so forth may be significant factors in automatically managing an enterprise user's transaction related activities.

Figure 1A:
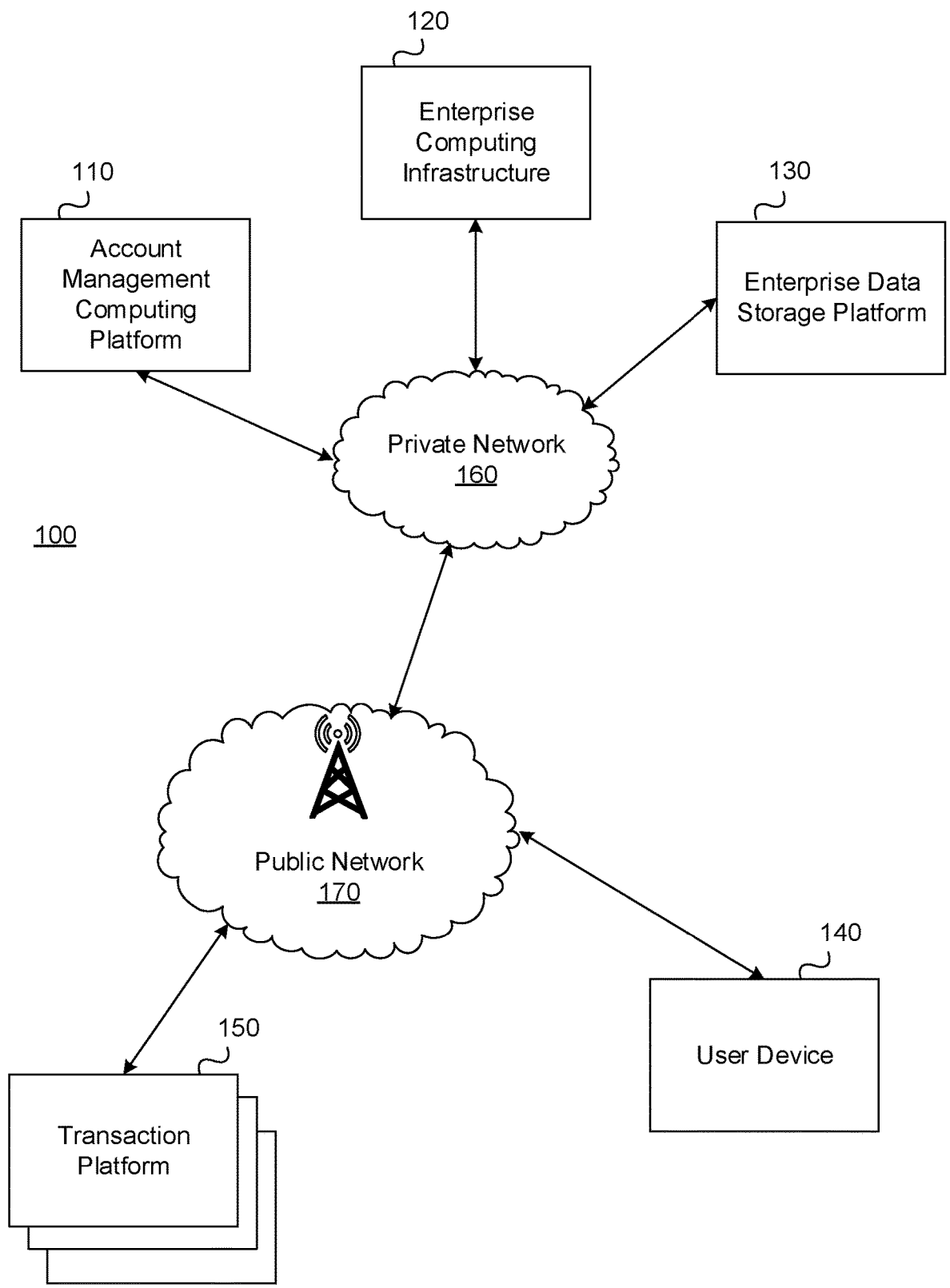
FIGS. 1A and 1B depict an illustrative computing environment for automated management of a user account.
Figure 1B:
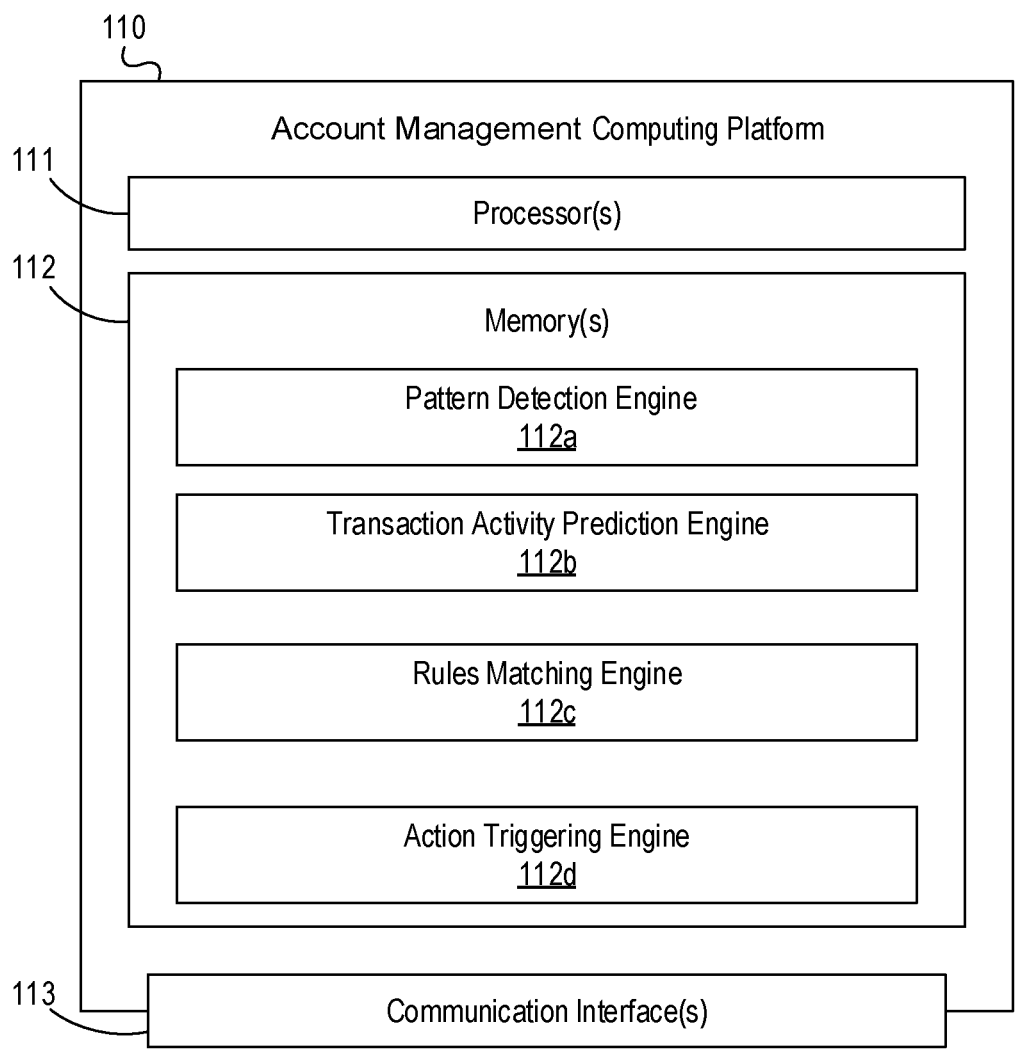

FIGS. 1A and 1B depict an illustrative computing environment for automated management of a user account. Referring to FIG. 1A, computing environment 100 may include one or more computer systems. For example, computing environment 100 may include an account management computing platform 110, enterprise computing infrastructure 120, an enterprise data storage platform 130, a user device 140, and a transaction platform 150.

As illustrated in greater detail below, account management computing platform 110 may include one or more computing devices configured to perform one or more of the functions described herein. For example, account management computing platform 110 may include one or more computers (e.g., laptop computers, desktop computers, servers, server blades, or the like) and/or other computer components (e.g., processors, memories, communication interfaces).

Enterprise computing infrastructure 120 may include one or more computing devices and/or other computer components (e.g., processors, memories, communication interfaces). In addition, enterprise computing infrastructure 120 may be configured to host, execute, and/or otherwise provide one or more enterprise applications. For example, enterprise computing infrastructure 120 may be configured to host, execute, and/or otherwise provide one or more transaction processing programs, an enterprise mobile application for user devices, automated payment functions, loan processing programs, and/or other programs associated with an enterprise server. In some instances, enterprise computing infrastructure 120 may be configured to provide various enterprise and/or back-office computing functions for an enterprise organization, such as a financial institution. For example, enterprise computing infrastructure 120 may include various servers and/or databases that store and/or otherwise maintain account information, such as financial account information including account balances, transaction history, account owner information, and/or other information. In addition, enterprise computing infrastructure 120 may process and/or otherwise execute tasks on specific accounts based on commands and/or other information received from other computer systems included in computing environment 100. Additionally or alternatively, enterprise computing infrastructure 120 may receive instructions from account management computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data. For example, enterprise data storage platform 130 may be configured to store and/or otherwise maintain, for enterprise customers, account information, payment information, payment schedules, patterns of activity, and so forth. Additionally or alternatively, enterprise computing infrastructure 120 may load data from enterprise data storage platform 130, manipulate and/or otherwise process such data, and return modified data and/or other data to enterprise data storage platform 130 and/or to other computer systems included in computing environment 100.

User device 140 may be a personal computing device (e.g., desktop computer, laptop computer) or mobile computing device (e.g., smartphone, tablet, wearable device). In addition, user device 140 may be linked to and/or used by a specific user (who may, e.g., be a customer of a financial institution or other organization operating account management computing platform 110). Also, for example, user of user device 140 may use user device 140 to perform transactions (e.g., perform banking operations, perform financial transactions, trade financial assets, and so forth).

Transaction platform 150 may include one or more computers (e.g., laptop computers, desktop computers, servers, server blades, or the like) and/or other computer components (e.g., processors, memories, communication interfaces). Transaction platform 150 may generally be a platform to conduct transactions. For example, transaction platform 150 may be a platform for mortgage loan payments. As another example, transaction platform 150 may be a platform for loan applications. Also, for example, transaction platform 150 may be a payment platform for a utility company, a telecommunications company, a credit card company, and so forth. Although not illustrated herein, in some embodiments, transaction platform 150 may be a component of account management computing platform 110, or may be a standalone component connected to private network 160. Also, for example, transaction platform 150 may represent a plurality of platforms.

Computing environment 100 also may include one or more networks, which may interconnect one or more of account management computing platform 110, enterprise computing infrastructure 120, enterprise data storage platform 130, user device 140, and transaction platform 150. For example, computing environment 100 may include a private network 160 (which may, e.g., interconnect account management computing platform 110, enterprise computing infrastructure 120, enterprise data storage platform 130, and/or one or more other systems which may be associated with an organization, such as a financial institution) and public network 170 (which may, e.g., interconnect user device 140 and transaction platform 150 with private network 160 and/or one or more other systems, public networks, sub-networks, and/or the like). Public network 170 may be a high generation cellular network, such as, for example, a 5G or higher cellular network. In some embodiments, private network 160 may likewise be a high generation cellular enterprise network, such as, for example, a 5G or higher cellular network.

In one or more arrangements, enterprise computing infrastructure 120, enterprise data storage platform 130, user device 140, transaction platform 150, and/or the other systems included in computing environment 100 may be any type of computing device capable of receiving input via a user interface, and communicating the received input to one or more other computing devices. For example, enterprise computing infrastructure 120, enterprise data storage platform 130, user device 140, and transaction platform 150, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of account management computing platform 110, enterprise computing infrastructure 120, enterprise data storage platform 130, user device 140, and transaction platform 150, may, in some instances, be special-purpose computing devices configured to perform specific functions.

Referring to FIG. 1B, account management computing platform 110 may include one or more processors 111, memory 112, and communication interface 113. A data bus may interconnect processor 111, memory 112, and communication interface 113. Communication interface 113 may be a network interface configured to support communication between account management computing platform 110 and one or more networks (e.g., network 150, network 160, a local network, or the like). Memory 112 may include one or more program modules having instructions that when executed by processor 111 cause account management computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of account management computing platform 110 and/or by different computing devices that may form and/or otherwise make up account management computing platform 110. For example, memory 112 may have, store, and/or include a pattern detection engine 112a, a transaction activity prediction engine 112b, a rules matching engine 112c, and an action triggering engine 112d.

Pattern detection engine 112a may have instructions that direct and/or cause account management computing platform 110 to determine, via a computing device and based on historical user activity of a user, a pattern of the user activity, as discussed in greater detail below. In some embodiments, pattern detection engine 112a may have instructions that direct and/or cause account management computing platform 110 to detect, via the computing device, a deviation from the pattern of the user activity. Transaction activity prediction engine 112b may have instructions to identify, via the computing device, an anticipated transaction of the user. Rules matching engine 112c may have instructions to retrieve, from a repository of user data, one or more user-defined preference rules associated with the anticipated transaction. In some embodiments, rules matching engine 112c may have instructions to determine whether the one or more preference rules apply to one or more attributes of the anticipated transaction. Action triggering engine 112d may have instructions to trigger, via the computing device and based on a determination that the one or more preference rules apply to the one or more attributes of the anticipated transaction, an action associated with the anticipated transaction.

Figure 2A:
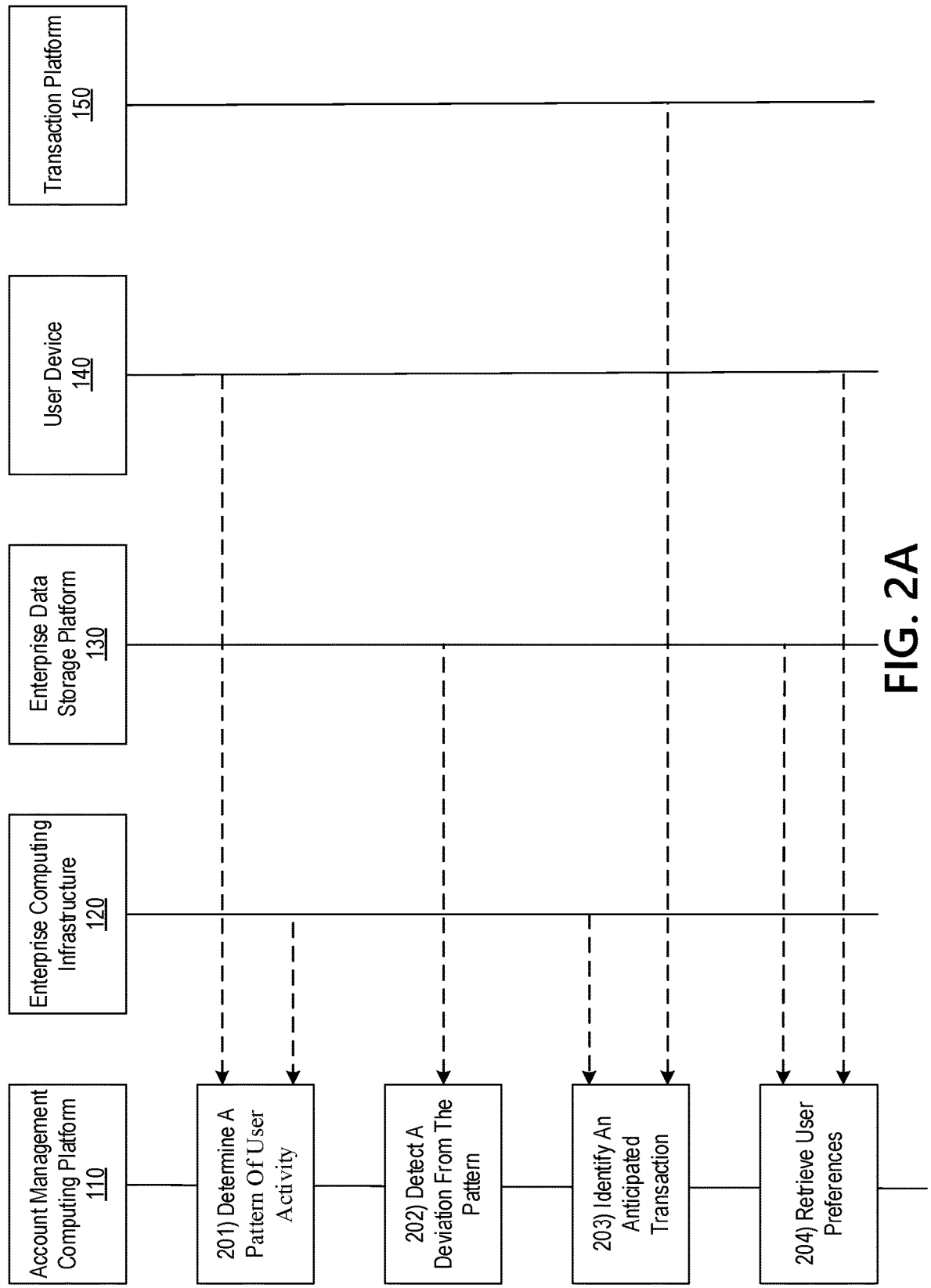
FIGS. 2A and 2B depict an illustrative event sequence for automated management of a user account.
Figure 2B:
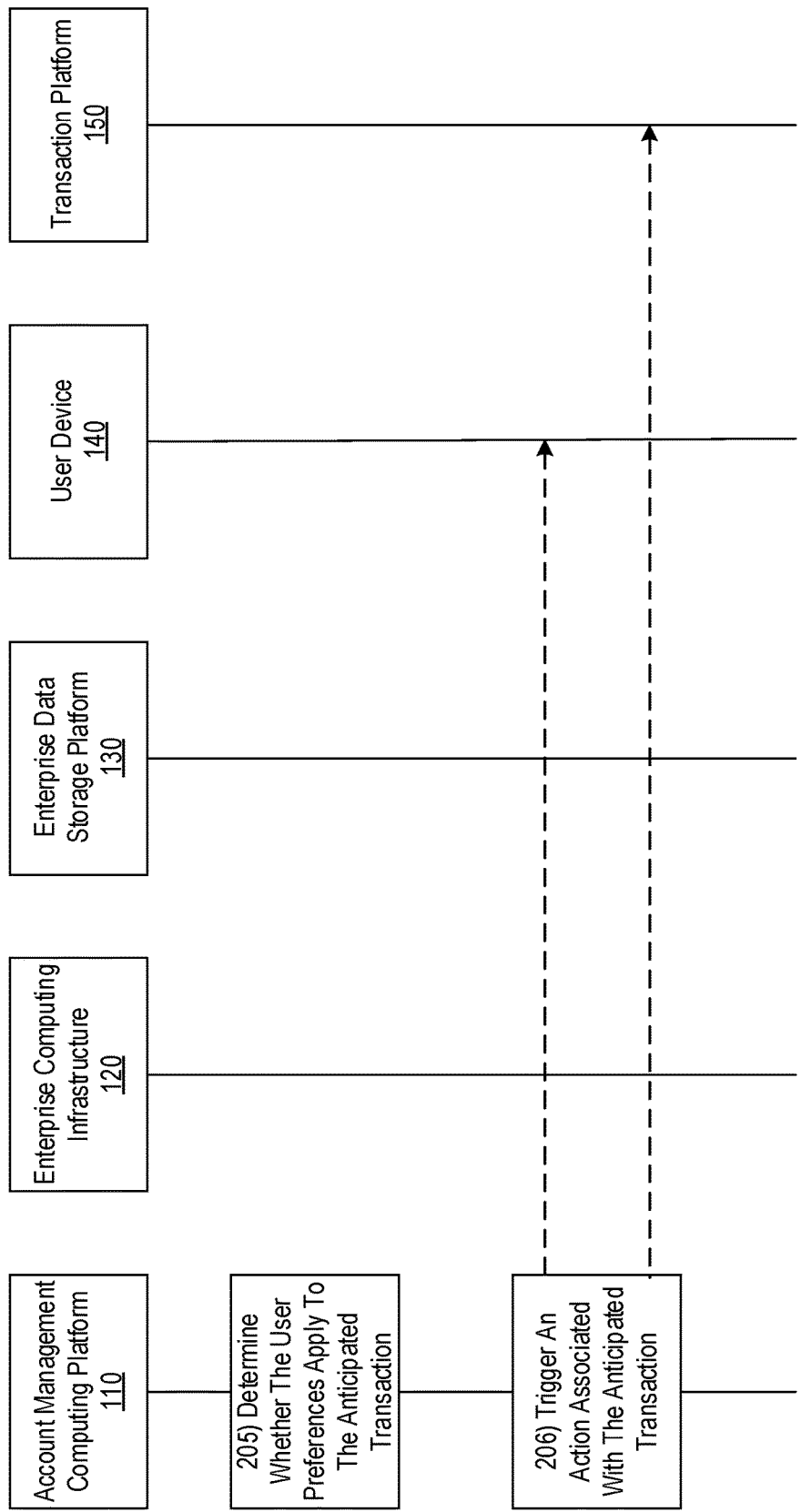

FIGS. 2A and 2B depict an illustrative event sequence for automated management of a user account. Referring to FIG. 2A, at step 201, account management computing platform 110 may determine, via a computing device and based on historical user activity of a user, a pattern of the user activity. For example, the user may perform various transactions, and account management computing platform 110 may store a record of such transactions in an enterprise storage platform (e.g., enterprise storage platform 130). For example, a user may have their income checks deposited directly. Also, for example, a user may configure one or more payments (e.g., credit card payments, utility bill payments, mortgage payments, and so forth) to be electronically paid. In some instances, such payments may be periodic, and may be paid automatically. Accordingly, account management computing platform 110 may determine a pattern of such transactions, including a payee, an amount of payment, a time of recurrence, a mode of payment, a pattern of late payments, a pattern of minimum payments, and so forth. In some embodiments, account management computing platform 110 may maintain a record of a user's login activity on a website or a mobile application.

In some embodiments, account management computing platform 110 may train a machine learning model to determine the pattern of the user activity. For example, clustering algorithms may be utilized to determine patterns of behaviors for users. For example, the clustering algorithm may take, as input, one or more attributes of user behavior, and classify users based on such behaviors. The one or more attributes may include consumer behavior, income activity, spending activity, credit rating patterns, loan activity, risk appetites, and so forth. In some embodiments, unsupervised learning algorithms, such as K-means clustering, principal component analysis, and so forth may be utilized. Accordingly, customers may be associated with clusters based on their patterns of activity.

In some instances, a customer may be incapacitated and/or otherwise unable to attend to managing their financial accounts, bills, and so forth. For example, the customer may be unwell, hospitalized, and/or incapacitated for a short-term or long-term, and so forth. Also, for example, the customer may have lost employment. As another example, the customer may have reduced income from a job, business, or other source of revenue. Also, for example, the customer may be in a geographical location that has experienced a natural disaster (e.g., earthquake, fire, volcanic eruption, flooding, hurricane, tornado, winter storm, and so forth), and the customer may not have access to their account. As another example, the customer may be in a location that is experiencing an emergency. In such circumstances, a customer may be subjected to further hardship due to increased bills, non-payment of bills, surmounting interest payments, fines for late and/or missed payments, and so forth. Accordingly, an enterprise organization may provide relief to customers by detecting such circumstances, and responding to the circumstances in a timely and effective manner.

At step 202, account management computing platform 110 may detect, via the computing device, a deviation from the pattern of the user activity. In some instances, account activity of a user may demonstrate signs of a hardship. For example, there may be changes to income deposits that may indicate a change in employment status. For example, income deposits may stop occurring, and/or an amount deposited may be less than a typical amount deposited. Also, for example, there may be changes to a payment activity, and this may be indicative of a potential financial hardship. For example, a customer may have a pattern of making timely payments, and account management computing platform 110 may detect that payments are delayed, overdue, and/or missed. As another example, account activity may indicate that the user has not logged in to their account for more than a prescribed amount of time. In some embodiments, a machine learning model may be trained to detect the historical pattern of user activity, and identify changes to the pattern based on changed user activity.

Also, for example, account management computing platform 110 may detect that a credit score of a customer is decreasing. As another example, account management computing platform 110 may detect that the customer activity indicates that the customer is seeking a loan. As another example, account management computing platform 110 may detect that the customer is purchasing construction related items and may be seeking a construction loan. Also, for example, a purchase activity may indicate that the customer is spending more on pharmaceutical purchases, and/or bills, and this may be indicative of a need for the user and/or someone the user cares for.

Generally, account management computing platform 110 may determine behavior patterns for a user based on activity, and along with information about their physical location, purchase history, spending habits, and so forth, account management computing platform 110 may detect changes indicative of a need for financial help. Accordingly, account management computing platform 110 may identify enterprise services such as, for example, loans programs, and may, in some instances apply interest-free loans toward payments.

In some embodiments, account management computing platform 110 may apply the machine learning model to detect the deviation from the pattern of the user activity. For example, a machine learning model may be trained to learn patterns and detect deviations from such patterns. For example, the machine learning model may be trained to detect one or more triggers indicative of a need for financial help. For example, activity around seeking credit may be an indicator of financial need. Also, for example, a customer may be applying for credit cards. As another example, a person's consumer history may indicate that they have historically made cash payments for certain types of purchases, but have now utilized a loan or a line of credit for similar types of purchases.

As another example, the machine learning model may be trained to determine a pattern of incoming funds, and detect a change in that pattern. For example, a customer may be receiving bi-weekly deposits into an account, and there may be a significant decrease in an amount of these deposits, and/or stop the deposits may stop. Also, for example, a customer may have historically made payments (e.g., credit card payments, mortgage payments, and so forth) on time, and may have started paying a minimum balance. In some embodiments, the machine learning model may be trained to correlate one or more patterns, events, activities, timings, and so forth, to detect additional hidden patterns, and/or triggers for financial need.

In some embodiments, the machine learning model may determine an alert score indicative of a financial need. For example, alert score may be based on an amount of deviation from a pattern of activity. For example, a customer may have missed a payment for a credit card, and the machine learning model may determine a small deviation from a pattern of activity, and may associate a low alert score with the customer. However, if the customer misses several payments, then the alert score may be increased. Also, for example, the customer may not receive a scheduled electronic deposit, miss a payment on a mortgage, make a minimum payment for a credit card, and search for loans. Accordingly, the machine learning model may determine a large deviation from a pattern of activity, and may associate a high alert score with the customer. In some embodiments, one or more transaction activities may be assigned weights, and the machine learning model may determine weighted aggregates to determine the alert score.

At step 203, account management computing platform 110 may identify, via the computing device, an anticipated transaction of the user. Upon detecting a deviation from a patterns, and/or based on one or more triggers, account management computing platform 110 may identify an upcoming transaction of the user. For example, account management computing platform 110 may detect that the user missed a payment, and may identify the missed payment as a transaction where the user may be likely to need financial help. Also, for example, the customer may not receive a scheduled electronic deposit, miss a payment on a mortgage, make a minimum payment for a credit card, and search for loans. Accordingly, account management computing platform 110 may identify the mortgage payment, the credit card payment, and providing a loan as transactions where the user may be likely to need financial help.

As another example, account management computing platform 110 may detect that there has been no login activity by a customer for longer than a threshold period of time. Accordingly, account management computing platform 110 may anticipate that the customer may miss one or more payments. Accordingly, account management computing platform 110 may identify such payments as transactions where the user may be likely to need financial help.

Also, for example, account management computing platform 110 may detect an increase in a number of bill payments, and may identify such payments as potential transactions where the customer may be likely to need financial help. As another example, account management computing platform 110 may detect, from data based on an email service, that there is an increased activity related to auto insurance, including, for example, a rental car transaction, calendar schedules for an auto body repair shop, and so forth. Accordingly, account management computing platform 110 may determine that an automobile accident may have occurred, and may identify one or more anticipated payments as transactions where the user may be likely to need financial help.

At step 204, account management computing platform 110 may retrieve, from a repository of user data, one or more user-defined preference rules associated with the anticipated transaction. For example, account management computing platform 110 may collect, from the user, preferences regarding various transactions, and store the preferences in a repository (e.g., enterprise data storage platform 130). In some embodiments, a machine learning model may learn user preferences from the patterns of historical activity, and account management computing platform 110 may provide the user with such recommended preferences. In some embodiments, the user may interact with account management computing platform 110 to refine the preferences, accept and/or reject the preferences.

In some embodiments, the one or more user-defined preference rules may include one or more of a preference associated with an automatic loan amount, a secondary funding source, automatic payment options, a designated alternate decision making authority, and preferred communication channels. The one or more user-defined preferences may generally relate to aspects of a transaction, such as, for example, an amount of loan, a level of risk, an amount of payments, a source of funding, an authorized user, a preferred mode of communication, and so forth. In some instances, the user-define preferences may indicate a type of transaction that the user may want account management computing platform 110 to manage automatically. For example, a user may allow account management computing platform 110 to make automatic recommendations, and/or make automatic payments for mortgage related transactions, but may not allow account management computing platform 110 to perform any functions related to an automobile loan payment.

In some embodiments, the one or more user-defined preferences may include an indication by the user to allocate a source of funding for a transfer. As another example, the user may indicate a percentage of an outstanding payment that may be automatically paid. Also, for example, the user may indicate that if a payment is not paid on a due date, then it may be automatically paid after a specified number of days (e.g., pay the mortgage bill 5 days after the due date). In some embodiments, the one or more user-defined preferences may include an indication by the customer to add such parameters for a transaction. For example, the user may allow account management computing platform 110 to automatically manage all aspects of forthcoming transactions. Also, for example, the user may identify certain types of transactions that may be automatically managed by account management computing platform 110. In some instances, the user may set time limits for non-activity, and may pre-authorize account management computing platform 110 to take action after the time limit expires.

In some embodiments, the user may indicate an amount of loan that the user may pre-authorize. For example, the user may have an outstanding credit card balance, and may not have sufficient funds in an account to make the payment. Also, for example, the user-defined preferences may indicate a pre-authorization of an automatic interest free loan.

Also, for example, the user-defined preferences may indicate that the user prefers to communicate via email, and account management computing platform 110 may contact the user via telephone only after a predetermined number of attempts to communicate via email. As another example, the user may designate another individual as a responsible party who may be contacted when the user is incapacitated. For example, a college student may authorize an established process to inform a parent or a guardian to a financial hardship of the student. Accordingly, account management computing platform 110 may provide relief to families by ensuring that loved ones are taken care of while the financial hardship may be manageable.

Generally, account management computing platform 110 may determine and store the one or more user-defined preferences prior to a time when account management computing platform 110 may make automatic payments and so forth. Accordingly, a customer may be presented with an opportunity to avoid and/or minimize additional financial hardships.

In some embodiments, account management computing platform 110 may determine the one or more user-defined preference rules by establishing, via an intelligent virtual assistant, an interactive session with the user. For example, an intelligent chat bot may utilize natural language processing to converse with the user. The intelligent virtual assistant may access an enterprise server (e.g., enterprise computing infrastructure 120) to identify one or more options available to a user. For example, the information for available resources may be organized in a hierarchical tree structure, and the intelligent virtual assistant may traverse this tree based on an interactive question-answer (Q/A) session with the user.

For example, account management computing platform 110 may provide, to the user, one or more questions in sequential format. In some embodiments, the sequential format may be based on the hierarchical tree structure. For example, account management computing platform 110 may ask "Would you like us to pay your credit card bill on the due date?" Also, for example, account management computing platform 110 may ask "Would you like to withdraw funds from your savings account to pay the mortgage?"

Then, account management computing platform 110 may receive, from the user, responses to the one or more questions. For example, the user may respond "Yes" to the question, "Would you like us to pay your credit card bill on the due date?" In some embodiments, the user may respond "Yes, but do not pay the entire balance." Additional and/or alternate user responses may be received.

Subsequently, account management computing platform 110 may provide, to the user and based on the responses, one or more additional questions. For example, account management computing platform 110 may ask "Would you like to pre-approve a minimum payment amount for your outstanding credit card balance?" As another example, account management computing platform 110 may ask "Would you like to pre-approve an interest free loan to pay your outstanding credit card balance?" Then, account management computing platform 110 may receive, from the user, responses to the one or more additional questions. For example, the user may respond "Yes" to a pre-approved loan, and account management computing platform 110 may ask the user to provide a range for the pre-approved loan.

As described herein, account management computing platform 110 may train the intelligent virtual assistant based on a machine learning model to analyze the responses, determine services available, and tailor the services to a user based on detected patterns of user activity. For example, a user may historically pay a minimum amount due for credit card balances. Accordingly, account management computing platform 110 may not ask the user "Would you like us to pay your credit card bill on the due date?" and may instead ask, "Would you like to pre-approve an interest free loan to pay the minimum amount due for credit card balances?"

In some embodiments, intelligent virtual assistant may integrate with one or more external artificial intelligence (AI) systems to provide recommendations to a user. Such AI systems may include, for example, a weather system, a news analysis system, a stock market analysis system, a virtual assistant associated with mobile devices, a consumer behavior analysis system, an email analysis system, and so forth.

Generally, the intelligent virtual assistant may utilize an AI machine learning system to initiate automated management of one or more customer accounts, provide messaging updates to the customer, receive user preferences, and so forth. In some embodiments, the AI system may proactively message the customer to provide updates about upcoming bills, account activity, account balance, and so forth. As described herein, the messages may be sent via a natural language processing system. Such messages may be sent via an SMS service, and may assume that the customer has a minimum level of internet connectivity. In some embodiments, the virtual assistant may interact with the customer via a telephone, a personal computer, a mobile device, a video link, and so forth. Also, for example, the virtual assistant may be configured to interact with the customer via a variety of channels, operating systems, natural languages, and so forth.

Referring to FIG. 2B, at step 205, account management computing platform 110 may determine whether the one or more preference rules apply to one or more attributes of the anticipated transaction. For example, account management computing platform 110 may identify the anticipated transaction as a credit card payment, and the user-defined preference may indicate that the user has approved automatic payment of the credit card payment. As another example, one or more attributes of the payment may relate to when the payment is to be made, a source of the funding, an amount of the payment, whether an automatic loan may apply toward the payment, and so forth. Accordingly, account management computing platform 110 may determine whether the user-defined preferences apply to the one or more attributes of the payment.

As another example, the anticipated transaction may be a payment for a mortgage loan, and one or more attributes of the payment may relate to whether an additional amount may be automatically paid toward the principal amount of the mortgage loan, what the additional amount may be, a timing of the payment, and so forth. Accordingly, account management computing platform 110 may determine whether the user-defined preferences apply to the one or more attributes of the payment.

Also, for example, the anticipated transaction may occur when a user is likely to be incapacitated. For example, account management computing platform 110 may determine that the user is undergoing treatment and is unable to access the account to process transactions. Accordingly, account management computing platform 110 may identify one or more attributes of the transaction to be whether the user has approved automatic payments, whether the user has designated an authorized individual to manage and/or approve transaction, and so forth.

As another example, account management computing platform 110 may determine that the user is located in an area that has been visited by a natural disaster, and account management computing platform 110 may determine that the user is unable to access a preferred mode of communication. Accordingly, the one or more attributes of an anticipated transaction may include an alternate mode of communication preferred by the user. For example, the internet coverage may have been affected, and account management computing platform 110 may determine that the user is not able to connect to the internet to receive email communications, or log in to their account. Accordingly, account management computing platform 110 may determine SMS messaging as a user-defined alternate mode of communication.

At step 206, account management computing platform 110 may trigger, via the computing device and based on a determination that the one or more preference rules apply to the one or more attributes of the anticipated transaction, an action associated with the anticipated transaction. For example, account management computing platform 110 may identify the anticipated transaction as a credit card payment, and the user-defined preference may indicate that the user has approved automatic payment of the credit card payment. Accordingly, account management computing platform 110 may trigger an automatic payment of the credit card payment. Also, for example, the one or more attributes of the payment may relate to when the payment is to be made, a source of the funding, an amount of the payment, whether an automatic loan may apply toward the payment, and so forth, and account management computing platform 110 may trigger the automatic payment in accordance with the one or more attributes of the payment.

As another example, the anticipated transaction may be a payment for a mortgage loan, and one or more attributes of the payment may indicate that an additional amount may be automatically paid toward the principal amount of the mortgage loan. Accordingly, account management computing platform 110 may trigger the automatic payment with the additional amount paid toward the outstanding principal.

Also, for example, the anticipated transaction may occur when a user is likely to be incapacitated, and account management computing platform 110 may trigger action on the anticipated transaction in accordance with the one or more attributes of the anticipated transaction. For example, account management computing platform 110 may determine that the user has designated an authorized individual to manage and/or approve transaction, and account management computing platform 110 may trigger contact with the authorized individual.

As another example, account management computing platform 110 may determine that the user is located in an area that has been visited by a natural disaster, and account management computing platform 110 may determine that the user has designated a preferred mode of communication. Accordingly, account management computing platform 110 may trigger contact with the user via the designated alternate mode of communication.

In some instances, account management computing platform 110 may trigger a low interest loan as an option for payment, as opposed to making a cash withdrawal on a credit card or a cash advance as options for payment. In some instances, a customer may not be aware of such alternative options, and account management computing platform 110 may provide the available options to the customer.

In some embodiments, the action associated with the anticipated transaction may include providing, via an intelligent virtual assistant, a recommendation to perform the anticipated transaction. For example, the intelligent virtual assistant may send an SMS message to the customer and state, "Your utility bill payment is due in 5 days. Text '1' if you would like to pay from your checking account, text '2' otherwise." The intelligent virtual assistant may subsequently receive a text with "2" and may send another SMS message stating "would you like to avail of a low interest loan to make the payment? Text '1' if yes, text '2' otherwise." The intelligent virtual assistant may subsequently receive a text with "1" and may trigger processing of a low interest loan, and utilize the loan to pay the utility bill.

In some embodiments, account management computing platform 110 may identify, from one or more external sources of data, one or more events that may impact the pattern of the user activity. As described herein, the user may be located in a geographical area that may have experienced a weather related event (e.g., snowstorm, hurricane, tornado, volcanic eruption, floods, forest fires, and so forth), a public care related event, and so forth. Generally, such events may disrupt a customer's ability to access their account, and/or process transactions. Account management computing platform 110 may retrieve data related to the event from an external weather system, a traffic alert system, a news agency, and so forth. As described herein, the one or more external sources of data may be artificial intelligence based systems. In some embodiments, the event may include one or more of a weather related event, an employment related event, a purchase related event, and a geopolitical event.

Then, account management computing platform 110 may identify an event of the one or more events that impacts the pattern of the user activity, where the action associated with the anticipated transaction may include a recommendation that minimizes the impact of the event for the user. For example, the event may be a natural disaster, such as, for example, a hurricane. The customer may have lost their house, or may have lost electrical power. Account management computing platform 110 may identify customer who may be in a zip code affected by the natural disaster, and may recommend steps to proactively mitigate the customer's potential loss. For example, account management computing platform 110 may identify and/or generate new loan schemes to help affected customers. For example, account management computing platform 110 may provide loans to rebuild a house that has been damaged. In some instances, the loan may be an interest-free loan. Also, for example, the loan may be a bridge loan configured to support a customer while an insurance payout is forthcoming. Also, for example, account management computing platform 110 may identify resources that may be made available to the affected customers. Generally, account management computing platform 110 may identify resources to and provide these to customers to support them during hardships, and help them return to normalcy.

For example, bureaus of motor vehicle include information related to vehicles that may indicate accidents, and so forth. Also, for example, a customer may authorize access to records, and —account management computing platform 110 may determine whether the customer has related expenses. As another example, an internet search history may indicate a user's anticipated expenses (e.g., travel expenses, construction expenses, home improvement expenses, educational expenses, and so forth). Generally, any information available in the public domain may be retrieved, and/or analyzed, to identify a potential impact to from an event that has occurred. Also, for example, utility company payment records, bank account information, sources of cash or credit, merchants with whom the customer transacts business on a regular basis, and so forth may be utilized to determine events that may impact an anticipated transaction.

Generally, account management computing platform 110 may determine when a customer may be in need of help, tailor resources to help the customer, and provide such resources to the customer in a timely manner.

Figure 3:
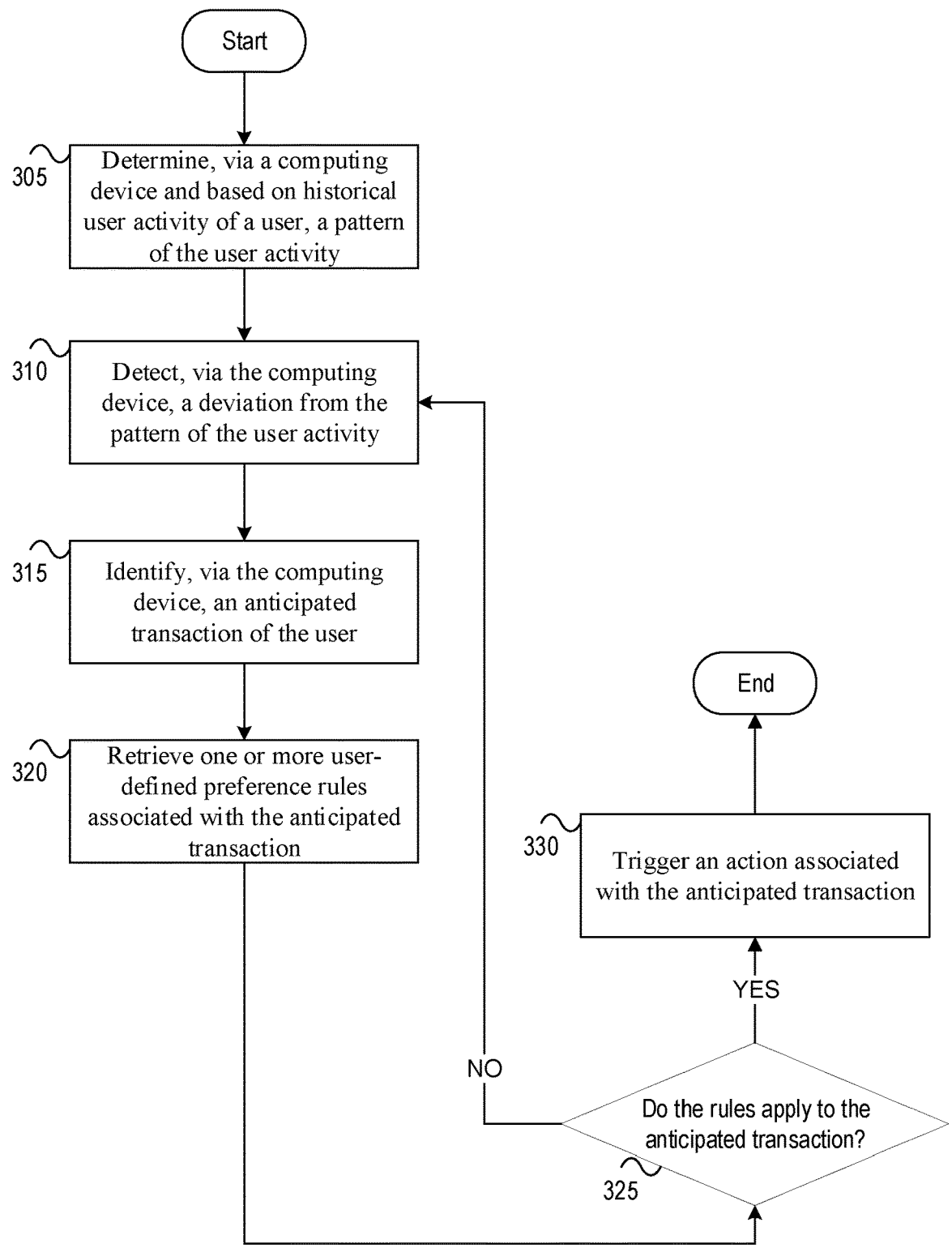
FIG. 3 depicts an illustrative method for automated management of a user account.

FIG. 3 depicts an illustrative method for automated management of a user account. Referring to FIG. 3, at step 305, a computing platform having at least one processor, and memory may determine, via a computing device and based on historical user activity of a user, a pattern of the user activity. At step 310, the computing platform may detect, via the computing device, a deviation from the pattern of the user activity. At step 315, the computing platform may identify, via the computing device, an anticipated transaction of the user. At step 320, the computing platform may retrieve, from a repository of user data, one or more user-defined preference rules associated with the anticipated transaction. At step 325, the computing platform may determine whether the one or more preference rules apply to one or more attributes of the anticipated transaction.

Upon a determination that the one or more preference rules apply to the one or more attributes of the anticipated transaction, the process may proceed to step 330. At step 330, the computing platform may trigger an action associated with the anticipated transaction. Upon a determination that the one or more preference rules do not apply to the one or more attributes of the anticipated transaction, the process may return to step 310.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor; and
   memory storing computer-readable instructions that, when executed by the at least one processor, cause the computing platform to:
   receive historical user activity data of a plurality of users;

identify, from the historical user activity data, one or more attributes of the plurality of users;
train a first machine learning model to determine patterns of user activity by using the one or more attributes as inputs in a clustering algorithm to classify the plurality of users based on the attributes;
receive user activity data of a first user;
determine, by executing the first machine learning model and based on the received user activity data of the first user, a pattern of first user activity;
detect a deviation from the pattern of the first user activity;
identify an anticipated transaction of the first user;
train, using the historical user activity data, an intelligent virtual assistant based on a second machine learning model, wherein training the intelligent virtual assistant causes the intelligent virtual assistant to, receive inputs including user response data, and, when executed, analyze the user response data, determine outputs available and tailor the outputs to provide to the user based on the determined pattern of the first user activity, wherein the intelligent virtual assistant is integrated with one or more external artificial intelligence systems;
determine one or more user-defined preference rules of the user, wherein determining the one or more user-defined preference rules includes:
  execute the intelligent virtual assistant to initiate an interactive session between the intelligent virtual assistant and the first user;
  receive user input related to the one or more user-defined preference rules;
  analyze, using natural language processing and by traversing a hierarchical tree structure, the user input to identify the one or more user-defined preferences; and
  store, based on the analyzed user input, the one or more user-defined preference rules in a repository of user data;
retrieve, from the repository of user data, the one or more user-defined preference rules associated with the anticipated transaction;
determine whether the one or more preference rules apply to one or more attributes of the anticipated transaction, wherein determining whether one or more preference rules apply to the one or more attributes of the anticipated transaction include:
  determining whether the user is able to connect to the internet;
  responsive to determining that the user is able to connect to the internet, providing communications to the user via a first mode of communication;
  responsive to determining that the user is not able to connect to the internet, providing communications to the user via a second, different mode of communication; and
trigger, based on a determination that the one or more preference rules apply to the one or more attributes of the anticipated transaction, an action associated with the anticipated transaction, wherein triggering the action includes at least providing communications to the user via one of: the first mode of communication and the second mode of communication.

2. The computing platform of claim 1, wherein the action associated with the anticipated transaction comprises providing, via the intelligent virtual assistant, a recommendation to perform the anticipated transaction.

3. The computing platform of claim 1, wherein the action associated with the anticipated transaction comprises payment of an outstanding balance.

4. The computing platform of claim 1, wherein the instructions comprise additional computer-readable instructions that, when executed by the at least one processor, cause the computing platform to:
  identify, from the one or more external artificial intelligence systems, one or more events that may impact the pattern of the first user activity;
  identify an event of the one or more events that impacts the pattern of the first user activity, and
  wherein the action associated with the anticipated transaction comprises a recommendation that minimizes the impact of the event for the first user.

5. The computing platform of claim 4, wherein the event comprises one or more of a weather related event, an employment related event, a purchase related event, and a geopolitical event.

6. The computing platform of claim 1, wherein determining the one or more user-defined preference rules further includes:
  providing, by the virtual intelligent assistant and to the first user, one or more questions in sequential format;
  receiving, from the first user, responses to the one or more questions;
  analyzing, using natural language processing, the responses to the one or more questions;
  providing, by the intelligent virtual assistant and to the first user and based on the analyzed responses, one or more additional questions; and
  receiving, from the first user, responses to the one or more additional questions.

7. The computing platform of claim 1, wherein the one or more user-defined preference rules comprise one or more of a preference associated with an automatic loan amount, a secondary funding source, automatic payment options, a designated alternate decision making authority, and preferred communication channels.

8. The computing platform of claim 1, wherein the instructions comprise additional computer-readable instructions that, when executed by the at least one processor, cause the computing platform to:
  apply the first machine learning model to detect the deviation from the pattern of the first user activity.

9. The computing platform of claim 1, wherein the intelligent virtual assistant is an intelligent chat bot.

10. A method, comprising:
at a computing platform comprising at least one processor, and memory:
  receiving historical user activity data of a plurality of users;
  identifying, from the historical user activity data, one or more attributes of the plurality of users;
  training a first machine learning model to determine patterns of user activity by using the one or more attributes as inputs in a clustering algorithm to classify the plurality of users based on the attributes;
  receiving user activity data of a first user;
  determining, by executing the first machine learning model and based on the received historical user activity data of the first user, a pattern of first user activity;
  identifying, from one or more artificial intelligence systems, an event of one or more events that impacts the pattern of the first user by the at least one processor and based on the identifying and based on a machine learning model, a deviation from the pattern of the first user activity;

identifying, by the at least one processor, an anticipated transaction of the first user;

training, using the historical activity data, an intelligent virtual assistant based on a second machine learning model, wherein training the intelligent virtual assistant causes the intelligent virtual assistant to, receive inputs including user response data, and, when executed, analyze the user response data, determine outputs available and tailor the outputs to provide to the user based on the determined pattern of the first user activity, wherein the intelligent virtual assistant is integrated with the one or more external artificial intelligence systems;

determining one or more user-defined preference rules of the user, wherein determining the one or more user-defined preference rules includes:
  executing the intelligent virtual assistant to initiate an interactive session between the intelligent virtual assistant and the first user;
  receiving user input related to the one or more user-defined preference rules;
  analyzing, using natural language processing and by traversing a hierarchical tree structure, the user input to identify the one or more user-defined preferences; and
  storing, based on the analyzed user input, the one or more user-defined preference rules in a repository of user data;

retrieving, from the repository of user data, one or more user-defined preference rules associated with the anticipated transaction;

determining whether the one or more preference rules apply to one or more attributes of the anticipated transaction, wherein determining whether one or more preference rules apply to the one or more attributes of the anticipated transaction include:
  determining whether the user is able to connect to the internet;
  responsive to determining that the user is able to connect to the internet, providing communications to the user via a first mode of communication;
  responsive to determining that the user is not able to connect to the internet, providing communications to the user via a second, different mode of communication; and triggering, by the at least one processor and based on a determination that the one or more preference rules apply to the one or more attributes of the anticipated transaction, an action associated with the anticipated transaction, wherein triggering the action includes at least providing communications to the user via one of: the first mode of communication and the second mode of communication.

11. The method of claim 10, wherein the action associated with the anticipated transaction comprises providing, via the intelligent virtual assistant, a recommendation to perform the anticipated transaction.

12. The method of claim 10, wherein the action associated with the anticipated transaction comprises payment of an outstanding balance.

13. The method of claim 10, wherein the action associated with the anticipated transaction comprises a recommendation that minimizes the impact of the event for the first user.

14. The method of claim 10, wherein the event comprises one or more of a weather related event, an employment related event, a purchase related event, or a geopolitical event.

15. The method of claim 10, wherein determining the one or more user-defined preference rules further comprises:
  providing, by the intelligent virtual assistant and to the first user, one or more questions in sequential format;
  receiving, from the first user, responses to the one or more questions;
  analyzing, using natural language processing, the responses to the one or more questions;
  providing, by the intelligent virtual assistant and to the first user and based on the analyzed responses, one or more additional questions; and
  receiving, from the first user, responses to the one or more additional questions.

16. One or more non-transitory computer-readable media storing instructions that, when executed by a computing platform comprising at least one processor, at least one physical sensor communicatively coupled to the at least one processor, and memory, cause the computing platform to:
  receive historical user activity data of a plurality of users;
  identify, from the historical user activity data, one or more attributes of the plurality of users;
  train a first machine learning model to determine patterns of user activity by using the one or more attributes as inputs in a clustering algorithm to classify the plurality of users based on the attributes;
  receive user activity data of a first user;
  determine, by executing the first machine learning model and based on the received user activity data of the first user, a pattern of first user activity;
  detect a deviation from the pattern of the first user activity;
  identify an anticipated transaction of the first user;
  train, using the historical activity data, an intelligent virtual assistant based on a second machine learning model, wherein training the intelligent virtual assistant causes the intelligent virtual assistant to, receive inputs including user response data, and, when executed, analyze the user response data, determine outputs available and tailor the outputs to provide to the user based on the determined pattern of the first user activity, wherein the intelligent virtual assistant is integrated with one or more external artificial intelligence systems;
  determine one or more user-defined preference rules of the user, wherein determining the one or more user-defined preference rules includes:
    execute the intelligent virtual assistant to initiate a first interactive session between the intelligent virtual assistant and the first user;
    receive user input related to the one or more user-defined preference rules;
    analyze, using natural language processing and by traversing a hierarchical tree structure, the user input to identify the one or more user-defined preferences; and
    store, based on the analyzed user input, the one or more user-defined preference rules in a repository of user data;
  retrieve, from the repository of user data, one or more user-defined preference rules associated with the anticipated transaction;
  determine whether the one or more preference rules apply to one or more attributes of the anticipated transaction, wherein determining whether one or more preference rules apply to the one or more attributes of the anticipated transaction include:
  determining whether the user is able to connect to the internet;
  responsive to determining that the user is able to connect to the internet, providing communications to the user via a first mode of communication;
  responsive to determining that the user is not able to connect to the internet, providing communications to the user via a second, different mode of communication;
initiate, via the intelligent virtual assistant and based on a determination that the one or more preference rules apply to the one or more attributes of the anticipated transaction, a second interactive session with the first user; and
trigger, based on the second interactive session, an action associated with the anticipated transaction, wherein triggering the action includes at least providing communications to the user via one of: the first mode of communication and the second mode of communication.

\* \* \* \* \*